United States Patent Office.

OTTO NICHOLAS WITT, OF WESTEND-CHARLOTTENBURG, NEAR BERLIN, ASSIGNOR TO THE BADISCHE ANILIN AND SODA FABRIK, OF MANNHEIM, GERMANY.

AMMONIUM SALT OF BETA-NAPHTHOHYDROQUINONE-BETA-SULPHONIC ACID.

SPECIFICATION forming part of Letters Patent No. 420,373, dated January 28, 1890.

Application filed August 3, 1889. Serial No. 319,679. (Specimens.) Patented in France April 11, 1889, No. 197,396.

*To all whom it may concern:*

Be it known that I, OTTO NICHOLAS WITT, a citizen of Switzerland, residing at Westend-Charlottenburg, near Berlin, in the Kingdom of Prussia and Empire of Germany, have invented new and useful Improvements in the Manufacture of Beta-Naphthohydroquinone-Beta-Sulphonic Acid (for which I have obtained a patent in France, No. 197,396, bearing date April 11, 1889,) of which the following is a specification.

My invention relates to the production of beta-naphthohydroquinone-beta-sulphonic acid by submitting amido-beta-naphthol-beta-sulphonic acid (a substance described by myself in the *Berichte der deutschen chem. Gesellschaft*, vol. XXI, p. 3475 sequ.) to the successive action of oxidizing and reducing agents, whereby it is transformed first into beta-naphthoquinone-sulphonic acid, and subsequently into beta-naphthohydroquinone-sulphonic acid.

In carrying out my invention I gradually introduce about three parts, by weight, of pure amido-beta-naphthol-beta-sulphonic acid into about three parts, by weight, of pure nitric acid of 1.2 specific gravity, stirring the mixture and cooling it all the while. Thus a yellow solution is obtained, from which yellow crystals will begin to separate out after a short time. These crystals, which are the ammonium salt of beta-naphthoquinone-sulphonic acid, are then mechanically freed from the adhering mother-liquor by filtering and pressing. I then dissolve the same in water, and add as much of aqueous sulphurous acid as will be sufficient to decolorize the solution. During an intermediate stage of this reaction the originally yellow color of the solution assumes a dark greenish-brown tint. The result of the operation is finally submitted to evaporation or concentration, when the ammonium salt of the beta-naphthohydroquinone-beta-sulphonic acid will be obtained in a crystallized condition.

In order to arrive at a practical result, I have found it necessary to employ the amido-beta-naphthol-sulphonic acid, as abovesaid, in a pure condition—such as, for instance, may be conveniently obtained by dissolving the said acid, previously to its being used, in an aqueous solution of sulphite of sodium, filtering, and subsequently adding hydrochloric or sulphuric acid. Amido-beta-naphthol-sulphonic acid will then separate out in a pure and crystallized state.

I further remark that in the above-described oxidizing-stage of the process nitric acid may be replaced by other oxidizing agents, especially by bromine or peroxide of lead. Thus, for instance, the hereinbefore-named yellow solution of the ammonium salt of beta-naphthoquinone-sulphonic acid may be obtained by gradually adding under constant cooling about two (2) parts, by weight, of liquid bromine to about three (3) parts, by weight, of amido-beta-naphthol-beta-sulphonic acid previously mixed with or suspended in ice-cold water. The clear yellow solution thus produced may then immediately be treated with aqueous sulphurous acid in the manner above described, in order to obtain the ammonium salt of beta-naphthohydroquinone-sulphonic acid.

The ammonium salt of beta-naphthohydroquinone-sulphonic acid, prepared as above described, presents the following characteristic properties: In its pure and crystallized condition it appears under the form of colorless plates, which are easily soluble in cold water. Its composition corresponds to the formula

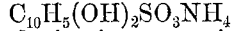
$$C_{10}H_5(OH)_2SO_3NH_4$$

Its aqueous solution is not precipitated by diluted hydrochloric acid. Upon the access of air to the solution rendered alkaline by the addition of ammonia or caustic potash or soda a dark-brown or greenish-brown color will quickly be developed. If a diluted solution of bromine be gradually added to the aqueous solution, first a dark-brown or greenish-brown color and finally a yellow color will appear. A very small proportion of perchloride of iron causes the aqueous solution of the ammonium salt of beta-naphthohydroquinone-beta-sulphonic acid to assume a yellowish-brown tint, which, upon the addition of ammonia in excess, changes into a bluish purple color. Solutions of the nitrates of silver and of protoxide of mercury are reduced under separation of their respective metals by adding thereto, at an ordinary temperature, the ammonium salt of beta-naphthohydroquinone-sulpho-acid. Equal molecules of the latter and of aromatic diazo compounds produce, by their combination, a series of azo colors distinguished by their property of dyeing with the aid of metallic mordants.

My coloring-matter is insoluble in alcohol and in benzine.

What I claim as new, and desire to secure by Letters Patent, is—

As a new product, the ammonium salt of beta-naphthohydroquinone-beta-sulphonic acid, hereinbefore described, which is produced by submitting amido-beta-naphthol-beta-sulphonic acid to the successive action of oxidizing and reducing agents, and which is a white crystalline solid easily soluble in cold water, its aqueous solutions quickly assuming a brown color upon the addition of caustic potash, soda, or ammonia, or of a small proportion of bromine or perchloride of iron, the color produced by the latter agent changing into a bluish purple upon the addition of ammonia and the color produced by bromine changing into a yellow upon the addition of more bromine, solutions of silver or mercurous nitrate are reduced in the cold under separation of their respective metals, equal molecules of the ammonium salt of beta-naphthohydroquinone-beta-sulphonic acid and of aromatic diazo compounds produce by their combination a series of azo colors distinguished by their property of dyeing with the aid of metallic mordants.

In testimony whereof I have hereunto set my hand in the presence of two subscribing witnesses.

OTTO NICHOLAS WITT.

Witnesses:
RUDOLF ZAERTLING,
GEO. H. MURPHY.